United States Patent [19]

Matsumoto

[11] Patent Number: 5,204,294
[45] Date of Patent: Apr. 20, 1993

[54] SILICON CARBIDE CERAMICS CONTAINING A DISPERSED HIGH METAL CONTENT SILICIDE PHASE

[75] Inventor: Roger L. K. Matsumoto, Newark, Del.

[73] Assignee: Hercules Incorporated, Wilmington, Del.

[21] Appl. No.: 779,652

[22] Filed: Oct. 21, 1991

[51] Int. Cl.$^5$ .................. C04B 35/56; C04B 35/58
[52] U.S. Cl. .......................................... 501/92; 501/96
[58] Field of Search ............................. 501/89, 92, 96

[56] References Cited

U.S. PATENT DOCUMENTS

| | | | |
|---|---|---|---|
| 4,729,972 | 3/1988 | Kodama et al. | 501/91 |
| 4,753,764 | 6/1988 | Kamijo et al. | 264/63 |
| 5,000,896 | 3/1991 | Petrovic et al. | 501/92 X |
| 5,023,214 | 6/1991 | Matsumoto et al. | 501/97 |
| 5,069,841 | 12/1991 | Petrovic et al. | 501/92 X |

FOREIGN PATENT DOCUMENTS 61-040899 2/1986 Japan .

OTHER PUBLICATIONS

J. J. Petrovic and R. E. Honnell, "MoSi$_2$ Particle-Reinforced SiC and Si$_3$N$_4$ Matrix Composites", *J. Mat. Sci. Lett.* 9 (1990) 1083-1084.

R. Matsumoto, "A New Cutting Tool Material—A Silicon Nitride/Intermetallic Silicide Composite", *Materials and Processing Report*, Apr. 1991, 5-6.

U.S. Serial No. 07/719,427 filed Jun. 24, 1991, Silicon Nitride Ceramics Containing a Dispersed Pentamolybdenum Trisilicide Phase.

*Primary Examiner*—Karl Group
*Attorney, Agent, or Firm*—Joanne W. Patterson

[57] ABSTRACT

A sintered silicon carbide product having improved fracture toughness contains from 1% to 80% by weight of (a) a uniformly dispersed, nonagglomerated, high metal content silicide of iron, nickel, cobalt or molybdenum in which the metal/silicon ratio is equal to or greater than 1. The silicon carbide starting material can be alpha-phase, beta-phase or a mixture of the two.

12 Claims, No Drawings

SILICON CARBIDE CERAMICS CONTAINING A DISPERSED HIGH METAL CONTENT SILICIDE PHASE

FIELD OF THE INVENTION

This invention relates to silicon carbide ceramics containing a dispersed phase to improve fracture toughness.

BACKGROUND OF THE INVENTION

Silicon carbide powders are not sinterable when they are in a pure form. Previously, boron or boron carbide and carbon were added in order to densify silicon carbide. Usually, the beta phase of silicon carbide is used as the starting material, with transformation into the alpha phase occurring as the densification process continues. Regardless of the starting material, the resulting ceramic has low fracture toughness values of approximately 4 MPa $\sqrt{m}$. This low fracture toughness value for monolithic silicon carbide limits its usage.

It is known that crack propagation in silicon carbide can be minimized by the inclusion of a dispersed phase, which provides a mechanism for energy diffusion. For example, J. J. Petrovic and R. E. Honnell, "$MoSi_2$ Particle Reinforced-SiC and $Si_3N_4$ Matrix Composites", J. Mat. Sci. Lett. 9 (1990) 1083-1084, disclose mixing SiC and molybdenum disilicide to improve the high temperature mechanical properties of the SiC composite. However, the molybdenum disilicide particles inhibit densification to less than 90% and the dispersion of the molybdenum disilicide is poor with large agglomerations visible in the microstructure. U.S. Pat. No. 4,729,972 (Kodoma et al.) discloses a SiC matrix containing carbide phases of titanium, zirconium, hafnium, vanadium, niobium, tantalum and tungsten having an average particle size of 30-150 microns. The sintered product has high strength and toughness.

SUMMARY OF THE INVENTION

The sintered ceramic product of this invention comprises (1) from about 20% to about 98% by weight of alpha-phase, beta-phase or a mixture of alpha- and beta phase silicon carbide, (2) from about 1% to about 80% of a nonagglomerated, uniformly dispersed, high metal content silicide of iron, nickel, cobalt or molybdenum in which the metal/silicon ratio is equal to or greater than one, and (3) from 0.02% to about 20% of at least one oxide, nitride or silicate of an element selected from IUPAC Groups 2, 3, 4, 13 or the lanthanide series, all percentages being by weight, based on the total weight of the composition.

DETAILED DESCRIPTION OF THE INVENTION

The silicon carbide used in this invention can be any commercial silicon carbide, either of the alpha or beta phase, or a mixture of alpha and beta phases. The silicon carbide is used in an amount of from about 50% to about 99% by weight, based on the total weight of the composition. Other refractory compound such as nitrides, borides, or carbides, that are chemically stable in the presence of silicon carbide can be used to replace up to 50% by weight of the SiC, e.g., titanium carbide, titanium diboride, zirconium carbide, and zirconium diboride.

In the preparation of the silicon carbide ceramics of this invention, the silicon carbide powder is mixed with from 1% to about 50% by weight, preferably 3% to 20%, based on the total weight of the composition, of Mo, Fe, Co or Ni. An oxide of these metals, or an alloy of these metals with each other or with another metal can also be used.

The powder mixture also includes from 0.02% to about 20% by weight, preferably from 0.5% to 10% by weight, of compounds that act as sintering aids. The sintering aid is an oxide, nitride, or silicate of an element from IUPAC Groups 2, 3, 4, 13 or the lanthanide series, or mixtures thereof. Oxides of aluminum, magnesium, calcium, strontium, zirconium, and yttrium are preferred. A combination of aluminum oxide and yttrium oxide is most preferred.

In order to impart optimum properties to the sintered product, the ingredients used to prepare the initial mixture should be finely divided, preferably having a particle size of less than than five microns, most preferably less than one micron. It is important that the finely divided particles be well dispersed, with no aggregates of like materials contained within the powder. This distribution is accomplished by milling the powders in the presence of a dispersant. Milling can be in aqueous or organic solvents, with the choice of dispersants depending upon the solvent used. Common aqueous dispersants are the DARVAN ® series, which are ammonium salts of polyelectrolytes, supplied by R. T. Vanderbilt. The type of mills used can be attrition mills, ball mills, or vibratory mills, with milling times ranging from one hour to 100 hours depending upon the size of the initial powders used. Long milling times result in greater milling media wear and short milling times can result in nonuniform mixing and incomplete reduction of particle size. The preferred milling times range from eight to 24 hours.

After milling, the solvent can be removed, for example, by spray drying. Solvent removal must not result in segregation of the constituent materials into aggregates.

The powder mixtures of this invention are preferably densified by simultaneously applying heat and pressure. The preferred processing techniques are hot pressing, hot isostatic pressing, and gas pressure sintering. The preferred sintering temperature range is from 1800° C. to 2200° C. Higher temperatures may be required in order to densify compositions starting with the alpha phase of silicon carbide. Lower temperatures are desirable when the starting beta phase is also desired in the final material, since higher temperatures will result in the conversion of the beta phase to the alpha phase. The pressure used can range from 500 psi to 15,000 psi, preferably 1000 to 5000 psi. A nonoxidizing, nonreactive atmosphere such as argon or helium is used to prevent reactions between the atmosphere and the constituent powders during sintering.

During sintering, the metal or metal compound reacts with silicon carbide in situ to form high metal content silicides. High metal content silicides are defined as those in which the metal/silicon ratio is equal to or greater than one, e.g., $Mo_5Si_3$, $Fe,Si$, $Co_2Si$, $CoSi$, $Ni_2Si$ and $Fe_3Si$. When molybdenum is used, a small amount of molybdenum carbide may be formed in addition to $Mo_5Si_3$. This result is unexpected, since existing high temperature thermodynamic data indicate that $MoSi_2$ should be more stable than MoC. $MoSi_2$ would also be expected to be more stable than $Mo_5Si_3$.

The sintered ceramic product comprises (1) from about 20% to about 98% of alpha phase, beta phase or a mixture of alpha- and beta-phase silicon carbide, (2) from about 1% to about 80% by weight of a nonagglomerated, uniformly dispersed, high metal content silicide of iron, nickel, cobalt or molybdenum in which the metal/silicon ratio is equal to or greater than 1, and (3) from 0.02% to about 20% of at least one oxide, nitride or silicate of an element selected from IUPAC Groups 2, 3, 4, 13, or the lanthanide series, all percentages being by weight based on the total weight of the composition.

The product is composed of (1) a silicon carbide matrix, (2) well dispersed, nonagglomerated particles of the high metal content silicide, and (3) an oxide, nitride or silicate phase between the matrix and the dispersed silicide. The product is useful for applications in which high fracture toughness is desired in SiC ceramics.

In the following examples, powders were milled for 16 hours in a small, vibratory mill, using water and DARVAN®C supplied by R. T. Vanderbilt as the dispersant. The slurries were spray dried in a small laboratory spray dryer and the powders were hot pressed uniaxially in graphite dies under argon. Sintered bulk densities were determined geometrically.

The dense sintered samples were then ground flat and polished to a 1 μm diamond finish. The parts were indented with a pyramidal diamond hardness tester (Vickers). The cracks emanating from the corners were used to estimate the fracture toughness of the material. A 1000 g load was applied on the indenter for 15 seconds. After measurement, the sample of Example 2 was further polished to determine the type of crack system that had developed. After about half of the depth of the indent was removed, no cracks remained. The cracks that had developed in these materials were thus what is known as Palmqvist cracks. In order to calculate the toughness, equations that have been derived for Palmqvist crack systems were used (see (1) D. K. Shetty et al., *J. Mat Sci.*, 20, 1873-82 (1985) and (2) J. Lankford, *J. Mat. Sci. Lett.*, 1, 493-95 (1982)).

| Example 1 | |
|---|---|
| Starting materials: | |
| beta-silicon carbide | 84.6% |
| cobalt metal (2 μm) | 10.0% |
| alumina | 3.6% |
| yttria | 1.8% |
| Hot Press Conditions | Results |
| 2000° C. for 2 hours at 4000 psi | Density = 3.32 g/cc (95.7% TD) |
| | Phases = beta-SiC + CoSi + small amount of alpha-SiC |
| | Rockwell A hardness (Ra) = 93.1 |
| | Strength = 380 MPa |

The microstructure of the densified material shows mainly equiaxed grains of about 2 μm (beta-phase) and occasional elongated grains having dimensions of 2 ×5 μm (alpha-phase). No cracks developed from Vickers indent corners, indicating high toughness.

| Example 2 | |
|---|---|
| Starting materials: | |
| beta-silicon carbide | 81.9% |
| iron metal (−325 mesh) | 10.0% |
| alumina | 2.7% |
| yttria | 5.4% |
| Hot Press Conditions | Results |
| 2000° C. for 1 hour at 4000 psi | Density = 3.3 g/cc |
| | Phases = beta-SiC + Fe$_2$Si |
| | Hardness (Ra) = 92.4 |
| | Strength = 400 MPa |
| | K$_{IC}$(Ref. 1) = 6.1 MPa √m |
| | K$_{IC}$(Ref. 2) = 5.8 MPa √m |

The microstructure of the densified material shows some tabular grains 5 μm across by 1 μm thick. The two methods of calculating fracture toughness agree very well. The values obtained are much higher than for monolithic silicon carbide, which has a value of only about 4 MPa √m.

| Example 3 | |
|---|---|
| Starting materials: | |
| beta-silicon carbide | 85.95% |
| cobalt metal (2 μm) | 10.00% |
| alumina | 1.35% |
| yttria | 2.70% |
| Hot Press Conditions | Results |
| 2000° C. for 1 hour at 4000 psi | Density = 3.3 |
| | Phases = beta-SiC + CoSi + alpha-SiC (trace) |
| | Hardness (Ra) = 92.8 |
| | Strength = 300 MPa |

The microstructure of the densified material shows equiaxed grains of about 2 μm and occasional larger elongated grains 3 μm by 5-10 μm long. No cracks developed from Vickers indent corners, indicating high fracture toughness.

| Example 4 | |
|---|---|
| Starting Materials: | |
| beta-silicon carbide | 85.95% |
| molybdenum metal | 10.00% |
| alumina | 1.35% |
| yttria | 2.70% |
| Hot Press Conditions | Results |
| 2000° C. for 2 hours at 4000 psi | Density = 3.4 g/cc |
| | Hardness (Ra) = 94.3 |
| | Strength = 499 MPa |
| | Phases = beta-SiC + small amount of alpha-SiC + MoC + Mo$_5$Si$_3$ |
| | K$_{IC}$(Ref. 1) = 7.1 MPa √m |
| | K$_{IC}$(Ref. 2) = 6.9 MPa √m |

The two methods for calculating fracture toughness agree very well. These values are higher than those obtained in Example 2, and are also much higher than those for monolithic silicon carbide. It appears that under these hot press conditions, molybdenum reacts with SiC to form both MoC and Mo$_5$Si$_3$ rather than the expected MoSi$_2$ phase.

I claim:

1. A sintered ceramic product consisting essentially of (1) from about 20% to about 98% of alpha-phase, beta-phase or a mixture of alpha- and beta-phase silicon carbide, (2) from about 1% to about 80% of a nonagglomerated, uniformly dispersed, high metal content silicide selected from the group consisting of Mo$_5$Si$_3$, Fe$_2$Si, Co$_2$Si, Ni$_2$Si and Fe$_3$Si, and (3) from 0.02% to about 20% of at least one oxide, nitride or silicate of an element selected from UIPAC Groups 2, 3, 4, 13, or the lanthanide series, all percentages being by weight based on the total weight of the composition.

2. The sintered product of claim 1 wherein up to 50% by weight of the silicon carbide is replaced by at least one refractory boride or carbide other than silicon carbide.

3. The ceramic of claim 1 wherein component (3) is a mixture of yttria and alumina.

4. The ceramic of claim 3 wherein the yttria is present in an amount of 1.0 to 6.0% and the alumina is present in an amount of 1.0 to 4.0%.

5. The ceramic of claim 1 wherein the high metal content silicide is $Fe_2Si$.

6. The ceramic of claim 5 wherein the $Fe_2Si$ is present in an amount of 5.0 to 12.0%.

7. The ceramic of claim 1 wherein the high metal content silicide is CoSi.

8. The ceramic of claim 7 wherein the CoSi is present in an amount of 5.0 to 12.0%.

9. The ceramic of claim 1 wherein the high metal content silicide is $Mo_5Si_3$.

10. The ceramic of claim 9 wherein the $Mo_5Si_3$ is present in an amount of 1.0 to 6.0%.

11. The ceramic of claim 1 wherein the SiC is completely beta-phase SiC.

12. The ceramic of claim 1 wherein the SiC is a mixture of alpha-phase and beta-phase SiC.

* * * * *